Dec. 18, 1962     O. FISCHER ETAL     3,068,773
PHOTOGRAPHIC CAMERA

Filed March 4, 1960     2 Sheets-Sheet 1

INVENTORS
Oskar Fischer
BY   Richard Sommer

ATTORNEYS

Dec. 18, 1962  O. FISCHER ETAL  3,068,773
PHOTOGRAPHIC CAMERA
Filed March 4, 1960  2 Sheets-Sheet 2

INVENTORS
Oskar Fischer
BY Richard Sommer
ATTORNEYS 3,068,773
PHOTOGRAPHIC CAMERA
Oskar Fischer, Braunschweig-Volkmarode, and Richard Sommer, Braunschweig-Gliesmarode, Germany, assignors to Voigtlander A.G., Braunschweig, Germany, a corporation of Germany
Filed Mar. 4, 1960, Ser. No. 12,737
Claims priority, application Germany Oct. 9, 1959
9 Claims. (Cl. 95—64)

This invention relates to photographic cameras and it has particular relation to photographic cameras which are provided with a distance adjusting scale and a depth of field scale associated with the distance scale, the scales being preferably arranged on rings located around the optical axis, especially on the casing of a central shutter.

It has been known to arrange scales of photographic cameras, e.g. the scales for the diaphragm aperture, exposure time, distance and range of the depth of field, in such manner that all these scales and their reading marks can be viewed simultaneously from a single direction of view, for example from above or from the front. Such arrangement can be frequently confusing. While the adjusted value of diaphragm opening, exposure time and distance are important for each and every photographic picture, information on the range of depth of field in not needed for the adjustment proper, but only as a control, which is dispensable in many cases. The conventional depth of field scale, which cooperates with the distance scale, affects the facility of reading the scales, if it is permanently visible in addition to the other scales.

The main object of the present invention is to provide an arrangement in which the scale of depth of field in not visible when the operator looks in the usual normal direction at the camera, and is visible only from a different direction, for example if the camera is tilted to some extent.

According to the present invention, in a photographic camera of the above described type, the distance scale is arranged on the peripheral surface of an adjusting ring and the scale of depth of field is arranged on a surface substantially perpendicular to the axis of the adjusting ring, and forming a surface of a carrier which surrounds said adjusting ring. In this arrangement, the scale of depth of field is covered by a transparent ring, the outer free surface of which—viewed in cross section—extends rectilinearly and inclined between the surfaces carrying the distance scale and the scale of depth of field. The use of this transparent ring, which covers the scale of depth of field and the free surface of which extends in the beforementioned manner, has the effect that the scale of depth of field can be observed only by looking at the scale from a direction which is about perpendicular to the oblique ring surface. From directions which essentially deviate from the right angle direction relative to the ring outer surface, the scale of depth of field cannot be seen, or cannot be clearly read. The reason is that, in such cases, the light rays are reflected from the surface of the transparent ring. If the scale of depth of field were not covered by transparent ring, this scale would be visible from directions deviating from the perpendicular to the outer ring surface. Thus, depending upon the particular direction in which the operator is looking at the camera, either the distance and other scales, such as the shutter time and diaphragm scales, which are arranged on surfaces parallel to the axis of the objective, or the depth of field scale, which is arranged on a surface which is perpendicular to the axis of the objective and which is covered by a reflective transparent ring, can be seen. Of course, the depth of field scale can be seen only when looking in directions substantially perpendicular to the outer surface of the transparent ring or substantially perpendicular to the scale itself.

The appended drawings illustrate by way of example two specific embodiments of and best modes for carrying out the invention, to which the invention is not limited.

Figure 1:
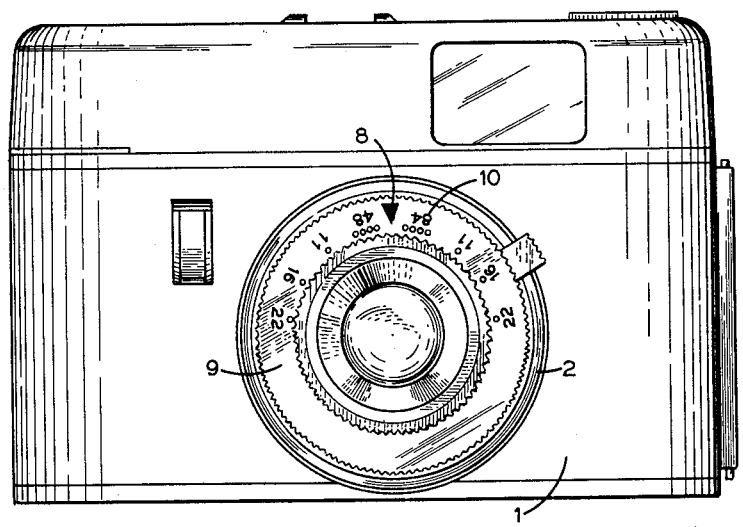
FIG. 1 is a front elevational view of a camera embodying the invention.
Figure 2:
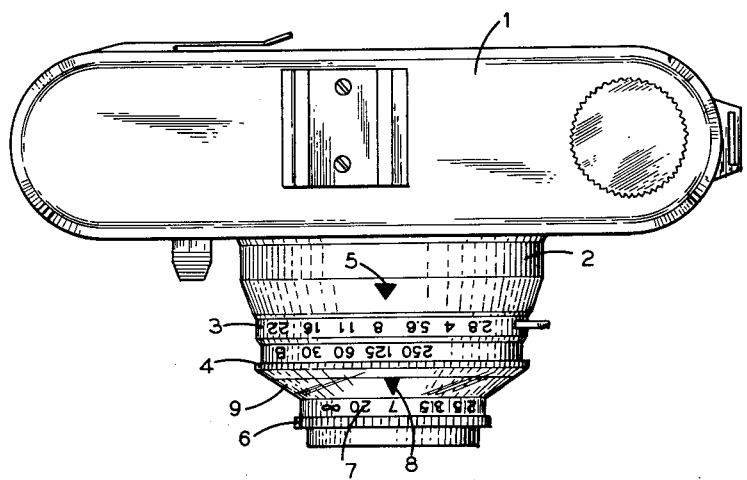
FIG. 2 is a top plan view of the camera shown in FIG. 1.

Referring now to the drawings in detail, the photographic camera 1 shown in FIGS. 1 and 2, has an objective shutter which forms, together with the objective mount, a mount body 2. In the latter, a diaphragm adjusting ring 3, and an exposure time adjusting ring 4 are rotatably arranged, and the scales of these rings are adjustable relative to a stationary mark 5. Reference symbol 6 denotes a distance adjusting ring, the scale 7 of which cooperates with a reading mark 8, and the latter is arranged on a transparent ring 9, which is fixedly connected with mount body 2. These scales and the cooperating adjustment marks, are visible when looking at the camera as viewed in FIG. 2.

The clear visibility of the above-mentioned scales would be affected by the presence of a depth of field scale arranged in conventional manner on the free surface of a nontransparent mount member part corresponding to ring 9, and extending on both sides of mark 8 and cooperating with distance scale 7.

By reference to FIG. 2, and from the foregoing description, it will be understood that the depth of field scale 10 is not visible to one looking at the camera as viewed in FIG. 2, but can be seen by one looking at the camera as viewed in FIG. 1 or by one looking at the camera along a line of sight substantially perpendicular to the outer surface of transparent ring 9. This effect is achieved by the arrangement shown more particularly in FIGS. 3 and 4.

Figure 3:
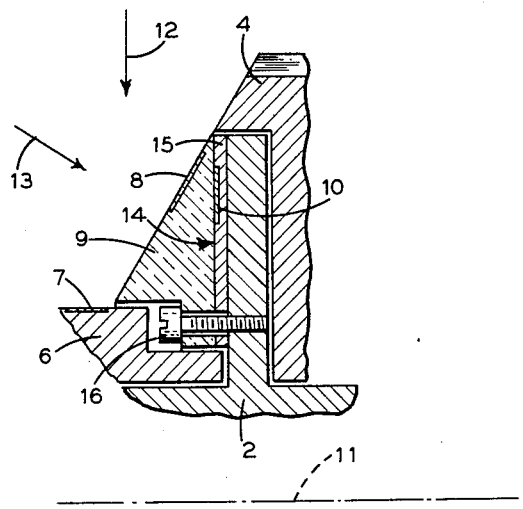
FIG. 3 is a partial axial sectional view through the objective mount body of the camera shown in FIGS. 1 and 2.
Figure 4:
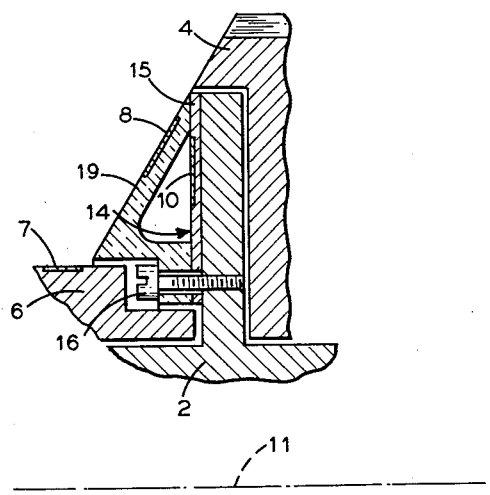
FIG. 4 is a view similar to FIG. 3 but illustrating another embodiment of the invention.

In FIGS. 3 and 4, the dash-dotted line 11 indicates the optical axis of the camera. Arrow 12 indicates the direction of viewing the camera, the scales of diaphragm aperture, exposure time and distance, as well as their marks 5 and 8, being readable, while the scale 10 of depth of field cannot be recognized when looking in this direction. However, scale 10 will be additionally visible when looking at the mount body 2 substantially in the direction of arrow 13.

The depth of field scale 10 is arranged on the surface 14 of a ring-shaped disc 15, and the latter is covered by a ring 9, which preferably consists of a transparent synthetic plastic material. Ring 9 and disc 15 are fastened by means of screws 16 to mount body 2. When looking in a direction substantially perpendicular to the transparent ring 9, this direction being indicated by the arrow 13 of FIG. 3, the surface 14 and the scale 10 on this surface are visible as is also the distance scale 7. Light rays incident in other directions are reflected by ring 9, so that surface 14 and scale 10 are then not visible.

Ring 9 may be a solid body, as shown in FIG. 3, or may be a thin-walled hollow body as illustrated in FIG. 4.

Scale 10 can be arranged on a particular disc 15 (as shown in FIGS. 3 and 4), or on a surface of mount body 2, or on a surface of ring 9, except the outer surface, which carries mark 8, of ring 9.

It will be understood from the above that this invention is not limited to the designs, arrangements and other

What is claimed is:

1. In a photographic camera having an objective: an objective mount assembly including a pair of relatively angularly adjustable annular elements coaxial with the objective axis and each having an annular scale carrying surface, said surfaces being adjacent but mutually perpendicular to each other, with one surface being cylindrical about the objective axis and the other surface lying in a diametric plane through the objective axis; a distance scale carried on one of said surfaces; a depth of field scale extending along the other of said surfaces and cooperable with said distance scale; and a transparent member extending along and overlying said depth of field scale and having a first and inner surface parallel to and immediately adjacent said other surface, and a second and outer surface extending between said two first mentioned surfaces and oblique to the latter; said outer surface reflecting light rays impinging thereon in a direction other than substantially normal thereto; whereby said depth of field scale is visible only when viewed along lines of sight substantially normal to either said outer surface or said inner surface.

2. In a photographic camera as claimed in claim 1, said outer surface of said transparent member carrying a reference mark cooperable with said distance scale.

3. In a photographic camera as claimed in claim 1: said distance scale being carried on said cylindrical surface coaxial with the axis of said objective; said depth of field being carried on said surface extending diametrically of the axis of said objective; said transparent member comprising an annular member coaxial with the axis of said objective and fixed relative to said element having the diametrically extending surface.

4. In a photographic camera as claimed in claim 3, said outer surface of said transparent member carrying a reference mark cooperable with said distance scale.

5. In a photographic camera as claimed in claim 3, said depth of field scale being carried by said inner surface of said transparent member.

6. In a photographic camera as claimed in claim 3, said depth of field scale being carried by said diametrically extending surface.

7. In a photographic camera as claimed in claim 3, said transparent member having a solid cross section body which is substantially triangular in cross section.

8. In a photographic camera as claimed in claim 3, said transparent member being a relatively thin walled hollow body which is substantially triangular in cross section.

9. In a photographic camera as claimed in claim 3, a substantially flat disk overlying and secured to said diametrically extending surface; said depth of field scale being carried on the outer surface of said disk.

References Cited in the file of this patent

UNITED STATES PATENTS

| | | |
|---|---|---|
| 540,768 | Western | June 11, 1895 |
| 2,914,998 | Rohloff et al. | Dec. 1, 1959 |
| 2,926,576 | Gunther | Mar. 1, 1960 |

FOREIGN PATENTS

| | | |
|---|---|---|
| 814,966 | Great Britain | June 17, 1959 |